May 15, 1934.    J. E. OWEN    1,959,004
METHOD FOR SURVEYING SUBSURFACE FORMATIONS
Filed July 16, 1931
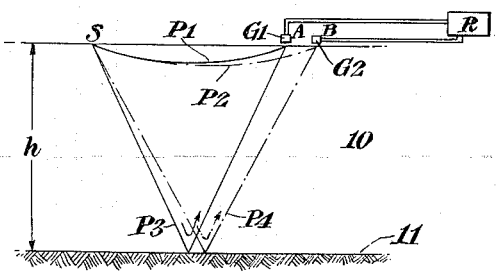
Fig. 1.
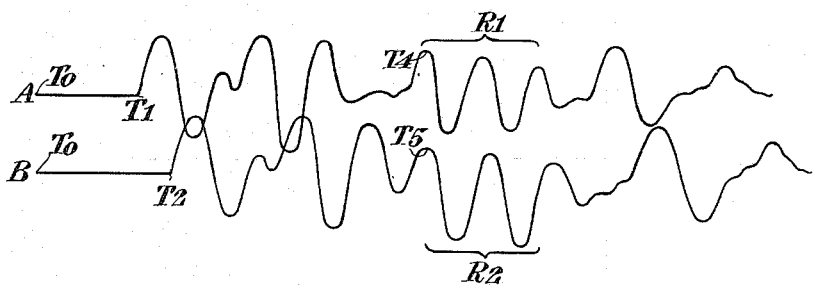
Fig. 2.
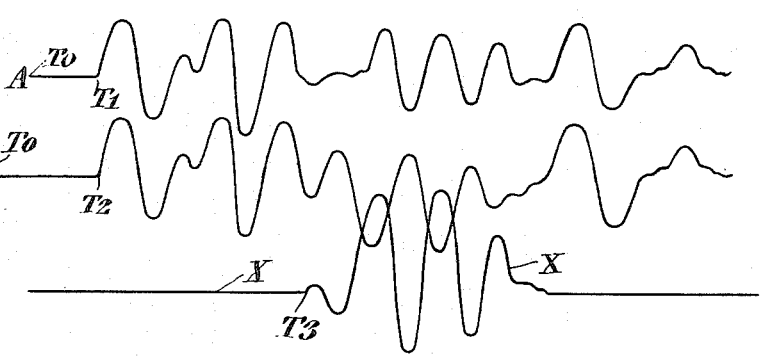
Fig. 3.
Fig. 5.
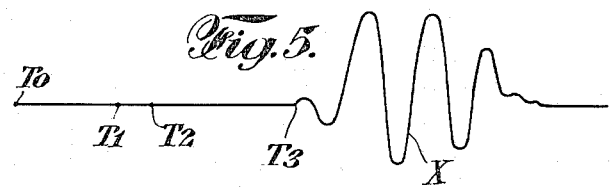
Fig. 4.
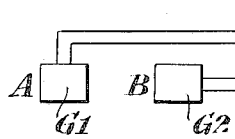
INVENTOR
John E. Owen
BY
Kenyon & Kenyon
ATTORNEYS.

Patented May 15, 1934

1,959,004

UNITED STATES PATENT OFFICE 1,959,004

METHOD FOR SURVEYING SUBSURFACE FORMATIONS

John E. Owen, Bloomfield, N. J., assignor to Geophysical Research Corporation, New York, N. Y., a corporation of New Jersey Application July 16, 1931, Serial No. 551,167

15 Claims. (Cl. 181—0.5)

This invention relates to methods for surveying sub-surface formations.

One method of determining the depth of a sub-surface formation is to create a disturbance near the earth's surface and measure the time required for a wave to travel from the point of disturbance to the sub-surface formation and be reflected to the earth's surface at a point removed from the point of disturbance. By means of the observed time interval and the known velocity of impulses in the soil, the depth of the sub-surface formation may be calculated. Heretofore, difficulty has been experienced in recording the time of transmission of the reflected waves due to the fact that they become so intermingled with what may be termed direct waves, that is, waves travelling to the point of reception without reflection, that it is not always possible to distinguish the effects of the reflected and direct waves on a seismograph record. Methods for eliminating the effects of the direct waves from a seismograph record have been suggested, the practice of which has resulted in the elimination of the effects of one frequency component of the direct waves and certain harmonics thereof, but heretofore no method has been developed for completely eliminating from a seismograph record the effects of the direct waves.

It is an object of this invention to produce a seismograph record in which the effects of the direct waves are entirely eliminated and the reflected waves are amplified, thus making it possible accurately to measure the time required for an artificially produced seismic wave to travel downwardly to a sub-surface formation and be reflected to the surface from which the depth of the sub-surface formation may be computed.

According to the present invention, the waves are received at two points differently spaced from the point of disturbance to produce a time interval between the arrival of the waves at said points, but sufficiently close that the direct waves received at said points are substantially identical. A record is made of the difference between the waves received at the two points with the direct waves in zero phase difference relation. The time interval between the arrival of the reflected waves at the two points differs from the time interval between the arrival of the direct waves at the two points so that with the direct waves in zero phase difference relation, the reflected waves will have an appreciable phase difference relation. The crests and troughs of the direct waves cancel each other, resulting in a straight line record, while the crests and troughs of the reflected waves will produce deviation from a straight line, thus making a definite and clear record of the time of arrival of the reflected waves at the first point. From the time of transmission of the reflected waves, the distance covered by them may readily be computed and the depth of the sub-surface formation determined in the well-known manner.

The direct waves may be composed of several different frequencies while the reflected waves may be confined to substantially single pulses which may or may not be of the same frequency as one of the direct wave components. Where the reflected waves are limited to single frequency pulses, the ideal condition exists. In such event, the two receiving points are so spaced that the time interval between the arrival of the direct waves thereat equals approximately one-half the period of the reflected waves plus the interval between the arrival of the reflected waves. For any considerable depth of sub-surface formation, the interval between the arrival of the reflected waves is negligible. Thus, with zero phase difference relation between the direct waves, the corresponding crests and troughs of the reflected waves are approximately 180° out of phase and when the record of the difference between the waves is produced, they supplement each other to produce a very marked indication of the time of arrival.

The basis of the present invention resides in the fact that the direct waves arriving at two points fairly close together, but at different distances from the wave source, are essentially alike in character, but arrive at the two points at different times. The reflected waves arriving at the two points also are alike in character, but the time difference between their arrival is much less than the time difference between the arrival of the direct waves. The present invention makes use of this fact to eliminate the direct waves and preserve the reflected waves by delaying the direct waves received at the point nearer the wave source by a time interval equal to the difference between the arrival times of the direct waves at the two points, thereby bringing the direct waves into zero phase relation and the reflected waves into approximately 180° out of phase relation and then impressing both waves with reverse polarity upon a recording instrument. The direct waves cancel each other while the reflected waves supplement each other so that no record is made of the direct waves, but an amplified record is made of the reflected waves.

The same ultimate result may be obtained graphically by recording simultaneously but separately graphs of the waves received at the two points, bringing the starting point of the two graphs into register and then manually recording the difference between the two graphs.

Other objects, novel features and advantages of this invention will be apparent from the following specification and accompanying drawing, wherein:

Fig. 1 represents a vertical section through the earth's crust, showing one arrangement of recording apparatus;

Figs. 2 and 3 are wave diagrams;

Fig. 4 is a view of a modified arrangement of recording apparatus used to record the composite wave directly, and Fig. 5 is a representation of the wave form resulting from the arrangement in Fig. 4.

In Fig. 1, 10 represents loose unconsolidated material forming a part of the earth's crust and 11 represents a sub-surface formation of rock or other dense material. S indicates the location of a charge of explosive or mechanical wave-producing means and R represents a seismograph recorder having two geophones $G_1$ and $G_2$ or other suitable wave detectors located at points A and B in the earth's crust. Each geophone or detector is connected in the usual manner to a recorder R and two separate graphs are produced on the same strip of paper in the well-known manner. Detonation of the explosive at S sets up elastic waves in the material 10. Certain of these waves will pass through the earth near its surface from the point S to the points A and B and the paths of these waves are represented by the full line $P_1$ and the dot-dash line $P_2$. Other waves will travel downwardly through the material 10 and be reflected from the sub-surface formation 11 up to the points A and B and the full line $P_3$ and the dot-dash line $P_4$ indicate respectively the paths of these waves.

The energy transmitted through the paths $P_1$ and $P_2$ may be composed of waves of several different frequencies while the energy transmitted along the paths $P_3$ and $P_4$ is usually confined primarily to substantially single pulses which may or may not be of the same frequency as one of the direct waves. The ideal condition exists when the reflected waves are limited to single pulses and for simplicity's sake, in the graphs shown in Fig. 2 the reflected waves are limited to single pulses. These graphs are of the impulses produced at A and B by the direct and reflected waves.

In these graphs $T_0$ represents time of detonation of the explosive while $T_1$ and $T_2$ designate respectively the time of arrival at points A and B of direct waves passing along the paths $P_1$ and $P_2$. These direct waves are the first to arrive at the points A and B and are followed by the reflected waves indicated in the span $R_1$ and $R_2$. $T_4$ and $T_5$ represent times of arrival of the first crests of the two reflected waves. Oftentimes the direct and reflected waves arrive so close together that they overlap and it is difficult to determine the time of arrival of the reflected waves.

When the reflected waves are composed of a single frequency pulse, the points A and B are so selected that the time interval between the arrival of the ground or direct waves at these two points theoretically equals one-half the period of the reflected wave, plus the interval between the arrival of the reflected waves at A and B. This condition may be expressed as follows:

$$(T_2-T_1) = \tfrac{1}{2}T_r + (T_5-T_4)$$

where $T_r$ is the period of the reflected waves and $(T_5-T_4)$ is the interval between the arrival of the reflected waves. It is obvious that the difference in length between the paths $P_3$ and $P_4$ is extremely slight for any considerable depth of sub-surface formation and therefore the term $T_5-T_4$ becomes negligible, thereby making the term $T_2-T_1$ equally approximate $\tfrac{1}{2}T_r$. The period of the reflected wave is determinable by experimentation in the particular location under survey and the required distance apart of A and B may be calculated by knowing the wave velocity in the material 10.

As shown in Fig. 3, a composite graph X in which the effects of the direct waves are eliminated, may be made by shifting the graph of the waves received at the point B to bring the point $T_2$ into register with the point $T_1$ and then manually recording the difference between the two graphs. By thus shifting the graph of the waves received at B, zero angular phase difference is produced between the graphs of the direct waves and since the graphs of these waves are of the same size and form, the crests and troughs will cancel to produce a straight line up to the point $T_3$ which represents the time of arrival of the reflected waves. Since $(T_2-T_1)=\tfrac{1}{2}T_r$, the crests and troughs of the reflected waves are approximately 180° out of phase and therefore supplement each other with the result that an amplified curvature is produced by means of which the time of arrival of the reflected waves is easily and accurately determinable. In the event of difference in amplitude between the waves recorded at the points A and B, the graphs are made of the same size before combination.

After determination of the time required for the reflected waves to pass from the point of detonation to the point of reception, the distance travelled by these waves may be calculated by use of the known velocity of waves in the earth's surface after which the depth of the sub-surface formation may be determined geometrically.

Where the reflected waves contain several frequencies the ideal distance between points A and B is not determinable and these points are arranged more or less arbitrarily so long as they are close enough that the direct waves received at these points are substantially alike. With zero phase difference relation between the direct waves, the crests and troughs of the direct waves cancel and the crests and troughs of the reflected waves combine to produce deviation from a straight line, but not to the same extent as when the ideal condition above referred to exists. The resultant graph for the direct waves will be a straight line and the resultant graph for the reflected waves will be a curve of sufficient deviation from straightness clearly to indicate the time of arrival of the reflected waves.

Preferably the record is automatically produced directly according to the disclosure in Figs. 4 and 5. An electrical geophone $G_1$, at point A is connected to a time delay device D so arranged that the waves received at A are delayed an interval equal to the difference in travel time of the direct waves between the point of disturbance and the points A and B, thus bringing the direct waves into zero phase difference relation. The delay device D and the geophone $G_2$ are connected series opposing with the recorder R, that is the terminals of the geophone $G_1$ (through the delay device D) and the terminals of the geophones $G_2$ are reversely connected to the terminals of the recorder R. By means of the delay device, the direct wave output from the geophone G1 is brought into zero phase difference relation with the direct wave output from the geophone G2 and by means of the reversed connections between the terminals of the two geophones and the terminals of the recorder, the two direct wave outputs are opposed and cancel each other and the recorder is not energized, thus producing a straight line on the record. The distance between the points A and B is preferably so chosen as to make the time interval between the arrival of the direct waves at these points approximately equal to one-half the period of the reflected waves. Therefore, with the direct wave outputs from the geophones in zero phase relation, the reflected wave outputs will be 180° out of phase, but by reason of these reflected wave outputs being opposed due to the reverse connections between the terminals of the geophones and the recorder terminals, they will be in phase with respect to their effect on the recorder R and will, therefore, strongly energize the recorder and produce an amplified indication on the record. The crests and troughs of the direct waves are automatically canceled and the recorder is not energized thereby, while the crests and troughs of the reflected waves are combined to produce a resultant impulse which energizes the recorder. Thus a straight line graph results from the direct waves and the start of the curve resulting from the reflected waves indicates the time of arrival of said waves. In effect, only the reflected waves are recorded. The resulting graph is shown in Fig. 5 in which $T_0$ and $T_3$ indicate respectively the time of detonation and the time of arrival of the reflected waves at point B.

It is obvious that in order to obtain complete cancellation of the direct wave outputs, it is necessary that the amplitudes thereof be the same and the equalization of the amplitudes of the outputs may be effected in any suitable manner. The individual pieces of apparatus required to carry out the automatic elimination of the direct waves are all well-known in the art. The electrical geophones may be of the Galitzin type, in which the motion of the earth causes relative motion between the coil of wire and a magnetic field, thus producing an electro-motive force which is amplified by a suitable vacuum tube amplifier and then caused to actuate a galvanometer. The delay device is preferably of the electrical type composed of inductances and capacities suitably arranged. It may, however, be of other forms, for example, an acoustical device or a combination of mechanical and electrical means.

The source of the seismic waves may be located at different depths in the earth, the usual depth being from 15 to 60 feet, but may be approximately 100 feet. The expression "at the earth's surface" as used in the claims is intended to cover the arrangement of wave sources throughout a relatively shallow stratum of the earth. It is to be understood that in the specification and claims, the term "seismic waves" is used as descriptive of waves produced in the earth by detonation of a charge of explosive at or near the earth's surface or produced by suitable mechanical means similarly placed and that the point $T_0$ on the graph represents the time of detonation of explosive or the time of starting production of waves by the mechanical means.

I claim:

1. The method of exploring geological formations which comprises creating a source of seismic waves at the earth's surface, receiving direct and reflected waves by seismometers located at different distances from said source and making a record of the difference between the effects produced by waves received by the seismometers after first bringing into zero phase difference relation those effects due to the direct seismic waves.

2. The method of exploring geological formations which comprises creating a source of seismic waves at the earth's surface, receiving direct and reflected waves by seismometers located at distances from the source such that the time interval between the arrival of the direct waves at said points approximates one-half the period of the reflected waves, and making a record of the difference between the effects produced by waves received by the seismometers after first bringing into zero phase difference relation those effects due to the direct waves.

3. The method of exploring geological formations which comprises creating a source of seismic waves at the earth's surface, receiving direct and reflected waves by seismometers located at different distances from said source, delaying the output of the seismometer nearer said source by a time interval equal to the difference in direct wave travel time from said source to each of said seismometers, impressing the outputs of said seismometers on a recording instrument, and recording the difference between them.

4. The method of exploring geological formations which comprises creating a source of seismic waves at the earth's surface, receiving direct and reflected waves by seismometers located at distances from the source such that the time interval between the arrival of the direct waves at said points approximates one-half the period of the reflected waves, delaying the output of the seismometer nearer said source by a time interval equal to the difference in direct wave travel time from said source to each of said seismometers, impressing the outputs of said seismometers on the recording instrument and recording the difference between them.

5. The method of exploring geological formations which comprises creating a source of seismic waves at the earth's surface, receiving direct and reflected waves by seismometers located at different distances from said source, delaying the output of the seismometer nearer said source by a time interval equal to the difference in direct wave travel time from said source to each of said seismometers, impressing the outputs of said seismometers in opposition on a recording instrument, and recording the combined effect thereof.

6. The method of exploring geological formations which comprises creating a source of seismic waves at the earth's surface, receiving direct and reflected waves by seismometers at distances from the source such that the time interval between the arrival of the direct waves at such points approximates one-half the period of the reflected waves, delaying the output of the seismometer nearer said source by a time interval equal to the difference in direct wave travel time from said source to each of said seismometers, impressing the outputs of said seismometers in opposition on a recording instrument and recording the combined effect thereof.

7. The method of exploring geological formations which comprises creating a source of seismic waves at the earth's surface, receiving direct and reflected waves by seismometers located at different distances from said source delaying the output of the seismometer nearer the source to establish zero phase difference relation between the direct wave outputs of said seismometers, impressing the outputs of said seismometers in opposition on a recording instrument, and recording the combined effect thereof.

8. The method of exploring geological formations which comprises creating a source of seismic waves at the earth's surface, receiving direct and reflected waves by seismometers located at distances from the source such that the time interval between the arrival of the direct waves at said points approximates one-half the period of the reflected waves, delaying the output of the seismometer nearer the source to establish zero phase difference relation between the direct wave outputs of said seismometers, impressing the outputs of said seismometers in opposition on a recording instrument, and recording the combined effect thereof.

9. The method of exploring geological formations which comprises creating a source of seismic waves at the earth's surface, receiving direct and reflected waves by seismometers located at different distances from said source, delaying the output of the seismometer nearer the source to establish zero phase difference relation between the direct wave outputs of said seismometers, impressing the waves on a recording instrument through connections from each terminal of the recording instrument to mutually opposing terminals of the seismometers and recording the combined effect thereof.

10. The method of exploring geological formations which comprises creating a source of seismic waves at the earth's surface, receiving direct and reflected waves by seismometers located at distances from the source such that the time interval between the arrival of the direct waves at said points approximates one-half the period of the reflected waves, delaying the output of the seismometer nearer the source to establish zero phase difference relation between the direct wave outputs of said seismometers, impressing the waves on a recording instrument through connections from each terminal of the recording instrument to mutually opposing terminals of the seismometers and recording the combined effect thereof.

11. The method of exploring geological formations which comprises creating a source of seismic waves at the earth's surface, receiving direct and reflected waves by seismometers located at different distances from said source, producing separate graphs of the waves received by said seismometers, arranging said graphs with the direct wave portions in zero phase difference relation and producing a graph of the difference between said first two graphs.

12. The method of exploring geological formations which comprises creating a source of seismic waves at the earth's surface, receiving direct and reflected waves by seismometers located at distances from the source such that the time interval between the arrival of the direct waves at said points approximates one-half the period of the reflected waves, producing separate graphs of the waves received by the two seismometers, arranging said graphs with the direct wave portions in zero phase difference relation and producing a graph of the difference between said first two graphs.

13. The method of exploring geological formations which comprises creating a source of seismic waves at the earth's surface, receiving direct and reflected seismic waves at points differently distant from said source, and making a record of the difference between the waves received at said point after establishing zero phase difference relation as to the direct waves.

14. The method of exploring geological formations which comprises creating a source of seismic waves at the earth's surface, receiving direct and reflected seismic waves at points located at distances from the source such that the time interval between the arrival of the direct waves at said point approximates one-half the period of the reflected waves, establishing zero phase difference relation as to the direct waves and making a record of the difference between the waves received at said points.

15. The method of exploring geological formations which comprises creating a source of seismic waves at the earth's surface, receiving direct and reflected seismic waves at points located at distances from the source such that the time interval between the arrival of the direct waves at said points approximates one-half the period of the reflected waves, and making a record of the difference between the waves received at said point after establishing zero phase difference relation as to the direct waves.

JOHN E. OWEN.